Aug. 18, 1959 — T. H. JOHNSTONE — 2,899,838
DELAYED ACTION BRAKE RELEASE
Filed Aug. 30, 1954
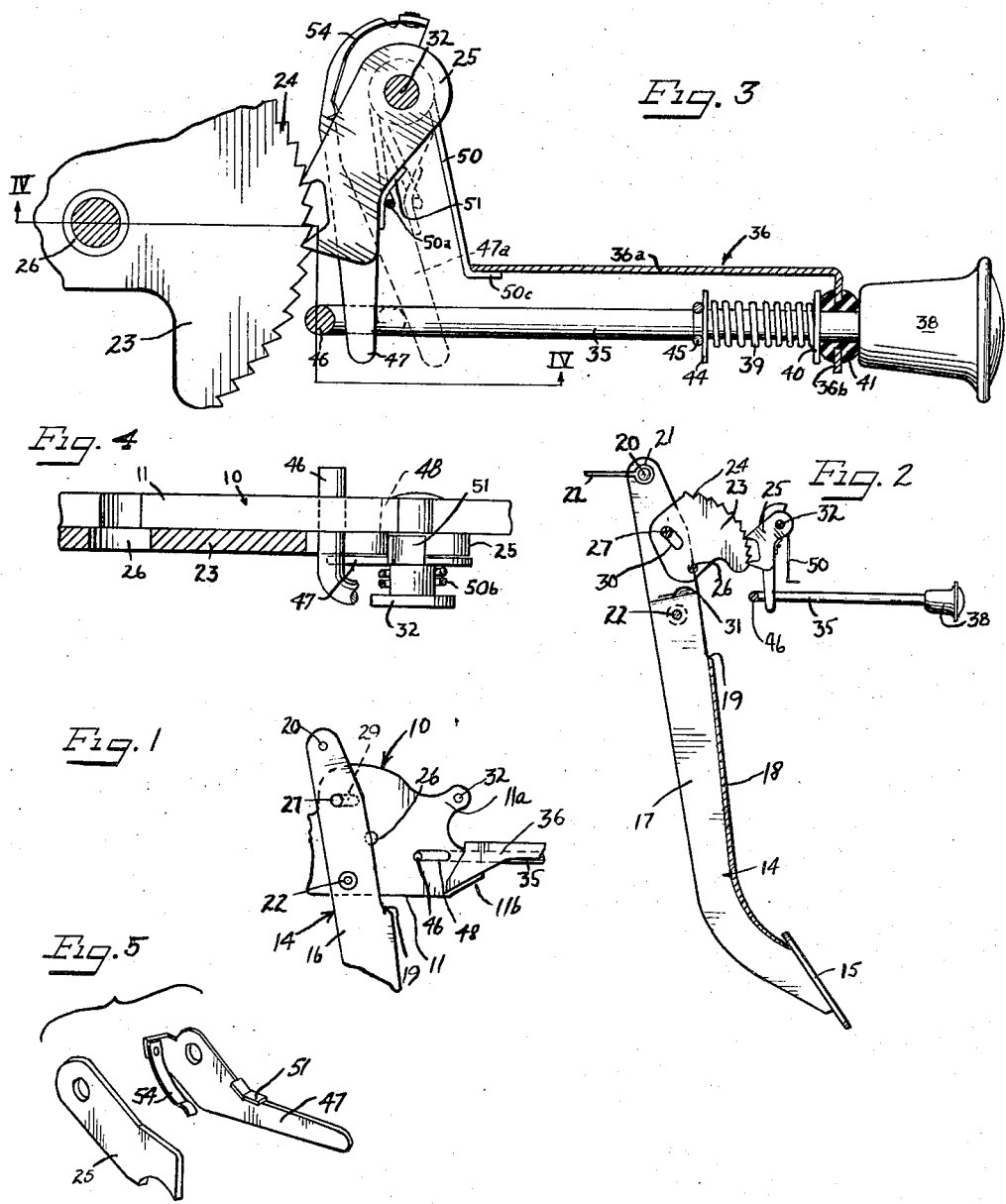
Inventor
Theodore H. Johnstone

United States Patent Office 2,899,838
Patented Aug. 18, 1959

2,899,838

DELAYED ACTION BRAKE RELEASE

Theodore H. Johnstone, Detroit, Mich., assignor, by mesne assignments, to The Bingham-Herbrand Corporation, a corporation of Ohio Application August 30, 1954, Serial No. 452,978

10 Claims. (Cl. 74—540)

The present invention relates to improvements in foot-operated brake levers and more particularly brake levers of the type that are adapted to be used for emergency or parking brakes.

An important object of the present invention is to provide a novel safety arrangement for preventing inadvertent release of a foot-operated brake lever.

Another object of the present invention is to provide an improved hand-operated pawl-release construction for a foot-operated brake lever.

A further object is to provide a novel foot-operated brake lever construction that can be manufactured and sold as a unit complete for quick assembly in a vehicle with which the brake lever is to be used.

In accordance with the objects and features of the present invention, there is provided a safety arrangement for a foot-operated brake lever having a manual release, whereby a slight pressure in the brake release direction on the foot pedal is required in conjunction with the manual release to effect release of the brakes.

Other objects, features and advantages of the present invention will be readily apparent from the following detailed description of a preferred embodiment thereof taken in conjunction with the accompanying drawings, in which:

Figure 1 is a fragmentary side elevational view of a brake lever assembly embodying the features of the present invention;

Figure 2 is a fragmentary longitudinal sectional view of the structure of Figure 1;

Figure 3 is a fragmentary enlarged longitudinal sectional view illustrating the ratchet release mechanism in greater detail;

Figure 4 is a fragmentary horizontal sectional view taken generally along the line IV—IV of Figure 3 and looking in the direction of the arrows; and Figure 5 is an exploded perspective view showing the ratchet pawl and release arm separate from the remainder of the assembly.

As shown on the drawings:

A brake lever assembly or unit according to the present invention is of the kind that is prefabricated as a complete unit ready for installation in a vehicle with which it is to be used and is adapted to be mounted in a convenient position for brake setting operation by the foot of the operator of the vehicle, with a manual release mechanism for operation by the hand of the operator in the release of the brake.

By way of example, the brake lever unit as shown in Figure 1 comprises a mounting bracket 10 which may be formed as a stamping from relatively heavy gauge sheet metal and include a flat elongated rearwardly extending body portion 11 and an attachment head portion (not shown) which may be angled to provide an attachment flange generally conforming to an angular portion of the fire wall or dash panel of an automobile or the like.

Pivotally mounted intermediate the ends of the bracket body 11 and at the lower portion thereof is a foot-operated brake lever 14 including a lower pedal 15 (Figure 2) facing generally rearwardly for actuation by the foot of an operator of the vehicle with which the unit is associated. By preference, the foot lever 14 is formed from suitable sheet metal in generally U cross-section with the channel thus formed opening forwardly and providing side flanges 16 and 17. The upper end portions of the side wall flanges lie in generally spaced parallel relation and with the rear or web portion 18 of the body of the foot lever cut out as indicated at 19 so that the upper end portions can straddle the bracket body 11. The upper portions of the lever side flanges project substantially above the upper edge of the bracket body 11 adjacent thereto and are provided with coaxial apertures 20 by which a connector 21 for the end of a brake-setting cable indicated at 22 can be attached to the upper end of the brake lever 14.

A pivot for the brake lever 14 is provided by a pin or rivet 22 extending through the lever side flanges 16 and 17 and through the bracket body 11. Thereby, the foot brake lever 14 is adapted to swing between a brake-release position shown in Figure 2, and a brake-setting position with the foot pedal 15 moved forwardly and the brake cable retracted to apply a brake-setting tension to the brakes of the vehicle.

Means are provided for retaining the foot brake lever 14 in brake-setting position, and for releasing the brake lever from the brake-setting position as desired. To this end, the upper portion of the lever is connected to a sector plate 23 provided with an arcuate series of ratchet teeth 24 on its rear edge cooperative with a detent pawl 25 carried by a rear end portion 11a of the bracket body 11, Figure 1.

The ratchet sector 23 is pivotally secured to the bracket body by means of a pin or rivet 26 generally at the center of curvature of the ratchet teeth 24. For moving the ratchet sector 23 about its pivot 26 as the brake lever 14 is moved to brake-setting position, a pin or rivet 27 extends through the lever side flanges 16 and 17 and through an arcuate slot 29 in the bracket body 11 (Figure 1) and a radial slot 30 in the sector plate 23 (Figure 2). The pin 27 and slot 30 constrain the sector plate 23 for pivotal movement with the brake lever 14 while accommodating a relative radial movement of the pin 27 toward the sector pivot 26. The arcuate slot 29 accommodates the arcuate movement of the pin 27 about the lever pivot 22. By preference, the ratchet sector 23 is mounted slidably alongside the bracket body 11 and is illustrated as being disposed on the right side of the bracket body (when looking toward the forward end of the vehicle). The upper end portion of the right lever side flange 17 may be offset from the remaining portion of the right flange as indicated at 31 to provide a greater separation between the flanges at the upper end to compensate for the thickness of the ratchet sector 23.

The pawl 25 is preferably formed of a heavy gauge sheet metal stamping and is of vertically elongated form and flat to lie slidably against the same face of the bracket body 11 that is slidably engaged by the sector 23 so that the pawl will lie in the same plane as the sector. By preference, both the pawl and the sector are formed from material of the same thickness. A pivotal conection of the pawl 25 with the bracket body plate rear portion 11a is afforded by a pivot pin or rivet 32 traversing the upper end portion of the pawl and the upper rear portion of the bracket body 11. The pawl is provided with a pair of spaced teeth for cooperating with the teeth 24 of the ratchet section 23 to retain the brake lever in an attained brake-setting position.

For releasing the pawl 25 from the ratchet sector 23 in the release of the brakes, a hand-release rod 35 is horizontally reciprocally mounted by means of a rearwardly extending bracket portion indicated at 36 in Figure 1 secured to the lower rear portion 11b of the bracket body 11. The bracket 36 comprises a top or web portion 36a, Figure 3, having a rear downturned flange 36b providing an aperture for the rod 35. An operating knob 38 is secured to the rear end of the rod and is biased toward its normal position, shown in Figure 3, by means of a spring 39 bearing at its rear end against a collar 40 slidable on the rod 35 and abutting a cushion member 41 secured by the rear downturned flange 36b, and at its forward end acting on the rod 35 through a collar 44 and retaining ring 45 fixed to the rod.

For preventing inadvertent release of the brakes by accidental retraction of the knob 38, and to prevent children from releasing the brakes, the release rod 35 is coupled to the pawl 25 by means of an inturned end portion 46 at the forward end of the rod which is designed to engage a depending arm 47 pivotally mounted on the pin 32. As seen in Figures 1 and 4, the inturned end portion 46 of the release rod 35 extends through the bracket body portion 11 which is provided with an elongated slot 48 to accommodate retractive movement of the release rod 35 and to guide the forward end of the release rod. Retraction of the release rod 35 thus serves to pivot the arm 47 about pin 32 and to the dot-dash position indicated at 47a in Figure 3. As indicated, this serves to relieve the pawl 25 from pressure of a spring 50 which normally acts through a flange 51, Figures 3 and 5, on the arm 47 to urge the pawl 25 into ratcheting engagement with the ratchet sector 23. It will further be observed from Figures 3 and 5 that the arm 47 carries at its upper end a secondary leaf spring 54 which upon retraction of the release rod 35 is urged into engagement with the pawl 25 to tend to move the pawl out of engagement with the ratchet sector 23. However, the leaf spring 54 is so selected that the tension generated is inadequate to release the pawl 25 from the ratchet 23 against the normal pressure exerted by the brake cable 21 on the ratchet 23 (through the medium of the upper portion of the lever 14 and the pivot 27).

Thus, when the knob 38 is retracted to its actuated position, the spring 54 is under tension in such an orientation as to urge the pawl 25 out of engagement with the ratchet teeth 24. However, the normal brake tension urges the ratchet teeth 24 into engagement with the pawl 25 in such a manner as to resist rotation of the pawl 25 out of engagement with the ratchet teeth 24 and this pressure is greater than the force exerted by the spring 54 on the pawl 25 in the disengaging direction. Thus, in order to release the brakes, a slight pressure must be exerted by the foot of the operator on the foot pedal 15 so as to release the normal braking pressure on the pawl 25 and allow the spring 54 to move the pawl out of engagement with the sector.

As best seen in Figures 3 and 4, the wire spring 50 has one end 50a extending across the central portion of the flange 51, an intermediate portion 50b wrapped around the pin 32, and an opposite end portion 50c hooked under the end of the bracket web portion 36a. It will be understood that an additional guide bracket may be provided toward the forward end of the release rod 35 similar to that shown at its rear end at 36b if desired.

The operation of the illustrated embodiment will now be readily apparent. After the brake lever assembly has been installed in a vehicle, and the emergency or parking brake cable indicated at 22 in Figure 2 has been attached to the upper end portion of the foot lever 14, the brake is easily set by pushing against the pedal or foot pedal portion 15 to swing the lower portion of the lever forwardly and the upper portion of the lever rearwardly, the sector 23 and pawl 25 functioning to retain the lever in brake-setting position. When it is desired to release the brake, the pull rod 35 is pulled rearwardly to exert a disengaging force on the pawl 25 through the secondary arm 47 and leaf-spring 54, the arm 47 also being effective to release the normal spring bias on the pawl exerted by the wire spring 50. Thereafter, a slight pressure is applied to the foot pedal 15 in the brake-setting direction to release the tension between the ratchet teeth 24 and the pawl 25 resulting from normal brake tension. The spring 54 then moves the pawl 25 out of engagement with the ratchet 23 to accommodate movement of brake lever 14 to brake-release position under the control of the foot of the operator on the foot pedal 15.

It will be understood that modifications and variations may be effected without departing from the scope of the novel concepts of the present invention.

I claim as my invention:

1. In combination in a foot-operated brake lever assembly, a bracket, a foot pedal lever pivoted to said bracket and depending therefrom, a ratchet member pivoted to said bracket and connected to said foot pedal lever for pivotal movement relative to the bracket upon pivotal movement of the lever, a pawl having a pivot shaft securing the same to said bracket for cooperation with said ratchet member to retain said foot pedal lever in incremental brake-setting positions, a secondary arm pivoted on said pivot shaft with said pawl, a wire spring operatively carried by said bracket for urging said pawl into ratcheting relation to said ratchet member, a manual release rod reciprocally mounted on said bracket for movement from a normal to an actuated position and engageable with said secondary arm to pivot the same from a normal to an actuated position, said secondary arm being engageable with said wire spring to release the tension thereof on said pawl by movement to actuated position, and further spring means for urging said pawl out of engagement with said ratchet member, the normal force of the brakes on said retaining mechanism in a brake-setting position being operative to maintain said pawl in brake-setting position against the urging of said further spring means until a brake-setting pressure is applied to said foot lever.

2. In combination in a foot-operated brake lever assembly, a bracket, a foot pedal lever pivoted to said bracket and depending therefrom, a ratchet member pivoted to said bracket and connected to said foot pedal lever for pivotal movement relative to the bracket upon pivotal movement of the lever, a pawl pivoted to said bracket and cooperating with said ratchet member for retaining said foot pedal lever in incremental brake-setting positions, spring means for urging said pawl into ratcheting engagement with said ratchet member, manual release means for releasing said spring means to accommodate movement of the pawl to a non-ratcheting position, and further spring means operative to urge said pawl out of engagement with said ratchet member but exerting a tension on said pawl less than the normal brake tension exerted on said pawl through said ratchet member to require a slight pressure in brake release direction on the foot pedal lever in conjunction with release of the tension of said first-mentioned spring means to release said pawl.

3. In combination in a foot-operated brake lever assembly, a bracket, a foot pedal lever pivoted to said bracket and depending therefrom, pawl means carried by said bracket for retaining said foot pedal lever in brake-setting position, a secondary arm pivotally mounted by said bracket, a leaf spring secured to said secondary arm and engageable with the pawl means for exerting a biasing force on said pawl means tending to release said pawl means upon pivotal movement of said secondary arm, and manual release means operative to pivot said secondary arm to exert said releasing force on said retaining means.

4. In combination in a foot-operated brake lever assembly, a bracket, a foot pedal lever pivoted to said bracket and depending therefrom, a ratchet member pivoted to said bracket and connected to said foot pedal lever for pivotal movement relative to the bracket upon pivotal movement of the lever, a pawl pivoted to said bracket and cooperating with said ratchet member for retaining said foot pedal lever in incremental brake-setting positions, a secondary arm pivotally mounted by said bracket adjacent said pawl, a leaf-spring carried by said secondary arm and engaging said pawl for exerting a force on said pawl tending to release said pawl from said ratchet member upon pivotal movement of said secondary arm, manual release means operative to pivot said secondary arm to exert said releasing force on said pawl, and a wire spring acting on said pawl to urge the same into ratcheting relation to said ratchet member, said secondary member being operative to release the tension of said wire spring on said pawl simultaneously with the exertion of said releasing force on said pawl by said leaf-spring.

5. In combination in a foot-operated brake lever assembly, a bracket, a foot pedal lever pivoted to said bracket and depending therefrom, a ratchet member operatively connected to said foot pedal lever for pivotal movement relative to the bracket upon pivotal movement of the lever, a pawl pivoted to said bracket and cooperating with said ratchet member for retaining said foot pedal lever in incremental brake-setting positions, a manual release rod axially reciprocably mounted on said bracket for movement between a normal and an actuating position, a secondary arm pivotally mounted by said bracket adjacent said pawl and depending therefrom for engagement with said release rod, a wire spring operatively connected with said secondary arm and with said pawl for normally urging said pawl into ratcheting relation with said ratchet member, movement of said manual release rod to actuated position pivoting said secondary arm and said secondary arm thereby moving said wire spring out of urging engagement with said pawl, said secondary arm having a leaf-spring carried thereby for engagement with said pawl and for urging said pawl out of ratcheting engagement with said ratchet member upon movement of said manual release rod to actuated position and the normal brake tension on said foot pedal lever being sufficient to retain said ratchet in engagement with said pawl against the action of said leaf spring to require a slight pressure in brake release direction on said foot pedal lever in conjunction with retraction of said release rod to actuated position to release said pawl.

6. In combination in a foot-operated brake lever assembly, a bracket, a foot pedal lever pivoted to said bracket and depending therefrom, a ratchet operatively connected to said foot pedal lever for pivotal movement relative to the bracket upon pivotal movement of the lever, a pawl cooperating with said ratchet member for retaining said foot pedal lever in incremental brake-setting positions, a pivot pin securing said pawl to said bracket, a secondary arm pivotally carried on said pivot pin adjacent said pawl and having a flange portion overlying an edge of said pawl opposite the edge of said pawl in engagement with said ratchet member, a wire spring encircling said pivot pin and acting on said flange to urge said pawl into ratcheting engagement with said ratchet member, and a manual release rod reciprocally mounted on said bracket and engageable with said secondary arm for pivoting the same about said pivot pin to release the tension of said wire spring on said pawl.

7. In combination in a foot-operated brake lever assembly, a bracket, a foot pedal lever pivoted to said bracket and depending therefrom, a ratchet operatively connected to said foot pedal lever for pivotal movement relative to the bracket upon pivotal movement of the lever, a pawl cooperating with said ratchet member for retaining said foot pedal lever in incremental brake-setting positions, a pivot pin securing said pawl to said bracket, a secondary arm pivotally carried on said pivot pin adjacent said pawl and having a flange portion overlying an edge of said pawl opposite the edge of said pawl in engagement with said ratchet member, a wire spring encircling said pivot pin and acting on said flange to urge said pawl into ratcheting engagement with said ratchet member, a manual release rod reciprocally mounted on said bracket and engageable with said secondary arm for pivoting the same about said pivot pin to release the tension of said wire spring on said pawl, and a leaf-spring carried by said secondary arm and acting on the edge of said pawl adjacent said ratchet member, the leaf spring being carried by said secondary arm on the opposite side of said pivot pin from said flange, and said secondary arm being movable by said manual release rod to release said wire spring and to tension said leaf-spring against said pawl in a direction to urge said pawl out of engagement with said ratchet member, the maximum force exerted by said leaf-spring tending to move said pawl out of engagement with said ratchet member being less than the normal brake tension exerted on said pawl through said ratchet member to thereby require a slight pressure in brake-release direction on said foot pedal lever in conjunction with retraction of said release rod to release said pawl.

8. In combination in a foot-operated brake lever assembly, a bracket, a foot pedal lever pivoted to said bracket and depending therefrom, a ratchet member operatively connected to said foot pedal lever for pivotal movement relative to the bracket upon pivotal movement of the lever, a pawl pivoted to said bracket to the rear of said ratchet member and having a ratchet-engaging tooth at the forward edge thereof for cooperating with the teeth of said ratchet member to retain said foot pedal lever in incremental brake-setting positions, a manual release rod axially repicrocably mounted on said bracket to the rear of said ratchet member and below said pawl for movement from a normal to an actuated position, a secondary arm pivotally mounted by said bracket laterally adjacent said pawl and having an extension depending into the path of movement of said release rod for abutting engagement therewith upon movement of the manual release rod toward actuated position to pivot said secondary arm relative to said bracket, a wire spring for exerting a force on said pawl urging the pawl into ratcheting relation to said ratchet member including an end portion extending across the rear edges of said secondary arm and said pawl for engagement by the rear edge of said secondary arm as the secondary arm is pivoted by movement of said release rod towards actuated position, and a leaf-spring carried by said secondary arm engaging the forward edge of said pawl and tensioned by pivoting of said secondary arm by said release rod to urge said pawl out of engagement with said ratchet member, the force exerted on said pawl by said leaf-spring with the release rod in actuated position being less than the normal brake tension exerted on said pawl through said ratchet member to require a slight pressure in brake-release direction on said foot pedal lever in conjunction with movement of said release rod to actuated position to release said pawl.

9. In combination in a foot operated parking brake assembly, bracket means, foot operated lever means mounted by said bracket means for swinging movement and having means for engagement by the foot of an operator at the lower end thereof, ratchet means coupled to said foot operated lever means for arcuate movement relative to the lever means and having a series of arcuately disposed ratchet teeth, pawl means pivotally mounted by said bracket means and having a pair of teeth each disposed to engage successive teeth of said ratchet means as the foot operated lever means is moved in brake setting direction to retain the foot operated lever means in successive incremental brake setting positions, and means for selectively moving said pawl means to a release position to move said pair of teeth out of engagement with said ratchet means and thereby release the brakes.

10. In combination in a foot operated parking brake assembly, bracket means, foot operated lever means mounted by said bracket means for brake setting movement and having means for engagement by the foot of an operator, ratchet means coupled to said foot operated lever means for arcuate movement relative to the lever means and having a series of arcuately disposed ratchet teeth, pawl means movably mounted by said bracket means and cooperable with said ratchet teeth to retain the foot operated lever means in successive incremental brake setting positions, secondary arm means movably mounted by said bracket means and having coupling means overlapping said pawl means and positively and rigidly engaging said pawl means for requiring joint movement of said pawl means and said secondary arm means in one direction of movement of said secondary arm means, said coupling means being de-coupled from said pawl means upon movement of said secondary arm means in the opposite direction, resilient means operative to urge said pawl means to follow said flange means as said secondary arm means is moved in the opposite direction, and means coupled to said secondary arm means for controlling movement thereof in the respective opposite directions to accommodate positioning of said pawl means respectively in ratcheting and non-ratcheting positions.

References Cited in the file of this patent

UNITED STATES PATENTS

| | | |
|---|---|---|
| 660,766 | Boyer | Oct. 30, 1900 |
| 816,099 | Jennings | Mar. 27, 1906 |
| 1,402,898 | Schwerin | Jan. 10, 1922 |
| 1,654,321 | Collins | Dec. 27, 1927 |
| 1,823,695 | Moorhouse | Sept. 15, 1931 |
| 2,119,638 | Klampferer | June 7, 1938 |
| 2,120,362 | Jandus | June 14, 1938 |
| 2,405,956 | Jandus | Aug. 20, 1946 |
| 2,467,557 | Jandus | Apr. 19, 1949 |
| 2,682,178 | Powell | June 29, 1954 |
| 2,694,945 | Jandus | Nov. 23, 1954 |
| 2,784,770 | Herr | Mar. 12, 1957 |
| 2,816,456 | Senkowski et al. | Dec. 17, 1957 |